(12) United States Patent
Takahashi et al.

(10) Patent No.: US 9,307,475 B2
(45) Date of Patent: Apr. 5, 2016

(54) MOBILE COMMUNICATION METHOD, RADIO ACCESS NETWORK APPARATUS, AND MOBILE STATION FOR CELL (RE)SELECTION PROCESSING BASED ON A RESULT OF RSRQ

(71) Applicant: NTT DOCOMO, INC., Tokyo (JP)

(72) Inventors: Hideaki Takahashi, Tokyo (JP); Yuta Sagae, Tokyo (JP); Hiroshi Chin, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/432,889

(22) PCT Filed: Oct. 3, 2013

(86) PCT No.: PCT/JP2013/076969
§ 371 (c)(1),
(2) Date: Apr. 1, 2015

(87) PCT Pub. No.: WO2014/054746
PCT Pub. Date: Apr. 10, 2014

(65) Prior Publication Data
US 2015/0304927 A1    Oct. 22, 2015

(30) Foreign Application Priority Data

Oct. 5, 2012   (JP) ................................. 2012-223641
Nov. 2, 2012   (JP) ................................. 2012-242809
Jan. 18, 2013  (JP) ................................. 2013-007466

(51) Int. Cl.
H04W 36/00   (2009.01)
H04W 36/30   (2009.01)
(Continued)

(52) U.S. Cl.
CPC ............... *H04W 36/30* (2013.01); *H04W 24/10* (2013.01); *H04W 48/12* (2013.01); *H04W 48/16* (2013.01); *H04W 48/20* (2013.01)

(58) Field of Classification Search
CPC ..... H04W 36/30; H04W 24/10; H04W 48/20; H04W 48/16
USPC .......................................................... 455/436
See application file for complete search history.

(56) References Cited

U.S. PATENT DOCUMENTS

2010/0255834 A1    10/2010   Ishii
2013/0094381 A1*   4/2013    Han .................... H04W 24/10
                                                          370/252

FOREIGN PATENT DOCUMENTS

WO    2009/057520 A1    5/2009

OTHER PUBLICATIONS

International Search Report for corresponding International Application No. PCT/JP2013/076969, mailed Dec. 10, 2013 (1 page).
(Continued)

*Primary Examiner* — Martin Mushambo
(74) *Attorney, Agent, or Firm* — Osha Liang LLP

(57) ABSTRACT

Appropriate "idle mode cell reselection" is achieved by changing a threshold used to perform "idle mode cell reselection" between a case of performing RSRQ measurement in six resource blocks and a case of performing "Wideband RSRQ measurement." A mobile communication method according to the present invention includes a step of causing a radio base station eNB or a radio network controller RNC to broadcast not only existing parameters used to perform cell reselection processing based on a result of the RSRQ measurement in six resource blocks, but also wideband parameters used to perform "idle mode cell reselection" based on a measurement result of "Wideband RSRQ measurement."

6 Claims, 21 Drawing Sheets

(51) Int. Cl.
*H04W 48/16* (2009.01)
*H04W 24/10* (2009.01)
*H04W 48/20* (2009.01)
*H04W 48/12* (2009.01)

(56) References Cited

OTHER PUBLICATIONS

Written Opinion for corresponding International Application No. PCT/JP2013/076969, mailed Dec. 10, 2013 (3 pages).
3GPP TS 36.133 V11.2.0; "3rd Generation Partnership Project; Technical Specification Group Radio Access Network; Evolved Universal Terrestrial Radio Access (E-UTRA); Requirements for support of radio resource management (Release 11);" Sep. 2012 (671 pages).
3GPP TS 36.300 V11.3.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11);" Sep. 2012 (205 pages).
3GPP TS 36.331 V11.1.0; "3rd Generation Partnership Project; Technical Specification Group Radio Access Network; Evolved Universal Terrestrial Radio Access (E-UTRA); Radio Resource Control (RRC); Protocol specification (Release 11);" Sep. 2012 (325 pages).
NTT DOCOMO, Inc.; "Introduction of wideband RSRQ measurements;" 3GPP TSG-RAN WG2 Meeting #79bis, R2-124814; Bratislava, Slovakia; Oct. 8-12, 2012 (10 pages).
NTT DOCOMO; "Issues on narrow measurement bandwidth;" TSG-RAN Working Group 4 Meeting #60, R4-114243; Athens, Greece; Aug. 22-26, 2011 (5 pages).
NTT DOCOMO, Inc.; "Introduction of wideband RSRQ measurements;" 3GPP TSG-RAN WG2 Meeting #79bis, R2-124813; Bratislava, Slovakia; Oct. 8-12, 2012 (7 pages).

* cited by examiner

FIG. 3

SystemInformationBlockType3 information element

```
-- ASN1START
SystemInformationBlockType3 ::=      SEQUENCE {
    ...                                                      OPTIONAL       -- Need OP
    lateNonCriticalExtension         OCTET STRING            OPTIONAL,      -- Need
OP
    [[ s-IntraSearch-v920            SEQUENCE {
            s-IntraSearchP-r9            ReselectionThreshold,
            s-IntraSearchQ-r9            ReselectionThresholdQ-r9
       }                                                     OPTIONAL,
    -- Need OP
       s-NonIntraSearch-v920         SEQUENCE {
            s-NonIntraSearchP-r9         ReselectionThreshold,
            s-NonIntraSearchQ-r9         ReselectionThresholdQ-r9
       }                                                     OPTIONAL,
    -- Need OP
       q-QualMin-r9                  Q-QualMin-r9            OPTIONAL,
    -- Need OP
       threshServingLowQ-r9          ReselectionThresholdQ-r9 OPTIONAL
    -- Need OP
    ]],
    [[ widebandRSRQMeas              ENUMERATED {enabled}    OPTIONAL,
    -- Need OP [specifying whether or not to execute wideband RSRQ measurement]
       s-IntraSearchForWB-RSRQ-v11xy     SEQUENCE {
            s-IntraSearchP-r11           ReselectionThreshold,
            s-IntraSearchQ-r11           ReselectionThresholdQ-r9
       }                                                     OPTIONAL,
    -- Need OP [threshold for intra-frequency measurement for wideband RSRQ measurement]
       s-NonIntraSearchForWB-RSRQ-v11xy   SEQUENCE {
            s-NonIntraSearchP-r11        ReselectionThreshold,
            s-NonIntraSearchQ-r11        ReselectionThresholdQ-r9
       }                                                     OPTIONAL,
    -- Need OP [threshold for inter-frequency measurement for wideband RSRQ measurement]
       q-QualMinFormWG-RSRQ-r11                              Q-QualMin-r9
    OPTIONAL,          -- Need OP [cell selection threshold for wideband RSRQ measurement]
       threshServingLowQ-ForWB-RSRQ-r11        ReselectionThresholdQ-r9
       OPTIONAL        -- Need OP [cell reselection threshold for wideband RSRQ measurement]
    ]:
}

-- ASN1STOP
```

| *SystemInformationBlockType3* field descriptions |
|---|
| ... |
| *widebandRSRQMeas* |
| This field is used to indicate whether the UE is required to perform RSRQ measurements with wider bandwidth. |

FIG. 4

*SystemInformationBlockType5 information element*

```
-- ASN1START

SystemInformationBlockType5 ::=      SEQUENCE {
...

[[ q-QualMin-r9              Q-QualMin-r9                  OPTIONAL,
    -- Need OP
        threshX-Q-r9             SEQUENCE {
            threshX-HighQ-r9         ReselectionThresholdQ-r9,
            threshX-LowQ-r9          ReselectionThresholdQ-r9
        }                                                      OPTIONAL
    -- Cond RSRQ
    ]],
    [[ widebandRSRQMeas          ENUMERATED {enabled}          OPTIONAL,
    -- Need OP [specifying whether or not to execute wideband RSRQ measurement]
        q-QualMin-ForWB-RSRQ-r11     Q-QualMin-r11
    OPTIONAL,        -- Need OP
        threshX-Q-ForWB-RSRQ-r11     SEQUENCE {
            threshX-HighQ-r11        ReselectionThresholdQ-r9,
            threshX-LowQ-r11         ReselectionThresholdQ-r9
        }                                                      OPTIONAL
    -- Cond RSRQ [cell reselection threshold for wideband RSRQ measurement]
    ]]
}

-- ASN1STOP
```

| SystemInformationBlockType5 field descriptions |
|---|
| |
| *widebandRSRQMeas* |
| This field is used to indicate whether the UE is required to perform RSRQ measurements with wider bandwidth. |

FIG. 6

System Information Block Type 19

```
InformationElements DEFINITIONS AUTOMATIC TAGS ::=

BEGIN
<<< skip unchanged text >>>

EUTRA-FrequencyAndPriorityInfo ::=   SEQUENCE {
    earfcn                            EARFCN,
    measurementBandwidth              EUTRA-MeasurementBandwidth           OPTIONAL,
    priority                          INTEGER (0..maxPrio-1),
    -- Actual value = IE value * 2
    qRxLevMinEUTRA                    INTEGER (-70..-22),
    -- Actual value = IE value * 2
    threshXhigh                       INTEGER (0..31),
    -- Actual value = IE value * 2
    threshXlow                        INTEGER (0..31),
    eutra-blackListedCellList         EUTRA-BlacklistedCellPerFreqList     OPTIONAL,
    eutraDetection                    BOOLEAN
}

EUTRA-FrequencyAndPriorityInfo-v920ext ::=  SEQUENCE {
    qqualMinEUTRA                     INTEGER (-34..-3)                    OPTIONAL,
    threshXhigh2                      INTEGER (0..31)                      OPTIONAL,
    threshXlow2                       INTEGER (0..31)                      OPTIONAL
}

EUTRA-FrequencyAndPriorityInfo-v11xyext ::= SEQUENCE {
    widebandRSRQMeasurement           ENUMERATED (true)                    OPTIONAL,
    qqualMinEUTRA-WB-RSRQ             INTEGER (-34..-3)                    OPTIONAL,
    threshXhigh2-WB-RSRQ              INTEGER (0..31)                      OPTIONAL,
    threshXlow2-WB-RSRQ               INTEGER (0..31)                      OPTIONAL
}

EUTRA-FrequencyAndPriorityInfoList ::=  SEQUENCE (SIZE (1..maxNumEUTRAFreqs)) OF
                                                 EUTRA-FrequencyAndPriorityInfo EUTRA-FrequencyAndPriorityInfoList-v920ext ::=  SEQUENCE (SIZE (1..maxNumEUTRAFreqs)) OF
                                                EUTRA-FrequencyAndPriorityInfo-v920ext EUTRA-FrequencyAndPriorityInfoList-v11xyext ::= SEQUENCE (SIZE (1..maxNumEUTRAFreqs)) OF
                                                EUTRA-FrequencyAndPriorityInfo-v11xyext

...

<<< Not affected ASN.1 >>>
```

FIG. 7

System Information Block type 19

| Information Element/Group name | Need | Multi | Type and reference | Semantics description | Version |
|---|---|---|---|---|---|
| UTRA priority info list | MP | | UTRA priority info list 10.3.7.113 | | REL-8 |
| GSM priority info list | OP | | GSM priority info list 10.3.7.114 | | REL-8 |
| E-UTRA frequency and priority info list | OP | | E-UTRA frequency and priority info list 10.3.7.115 | | REL-8 |
| CELL_FACH Absolute Priority Measurement Indicator | OP | | Enumerated (High Priority Layers, All Layers) | High Priority Layers means that absolute priority measurements are only required in CELL_FACH state on higher priority layers when Srxlev and Squal of the serving cell are above Sprioritysearch1 and Sprioritysearch2.<br><br>All Layers means that absolute priority measurements are always required in CELL_FACH state according to the rules in [4] and requirements in [19]. | REL-11 |

FIG. 8

E-UTRA frequency and priority info list

| Information Element/Group name | Need | Multi | Type and reference | Semantics description | Version |
|---|---|---|---|---|---|
| >Wideband RSRQ measurements | OP | | Enumerated (TRUE) | This IE indicates whether the UE is required to perform RSRQ measurements with wider bandwidth. | REL-11 |
| >QqualminEUTRA for wideband RSRQ measurements | MD | | Integer (-34..-3) | RSRQ, dB default value is negative infinity | REL-11 |
| >Thresh$_{X, high2}$ for wideband RSRQ measurements | OP | | Integer (0..31) | RSRQ, dB | REL-11 |
| >Thresh$_{X, low2}$ for wideband RSRQ measurements | OP | | Integer (0..31) | RSRQ, dB | REL-11 |
| Multiple E-UTRA frequency info list | OP | 1 to <maxNum EUTRAFreqs> | | Each entry in the list corresponds to an entry in the "E-UTRA frequency and priority" IE. | REL-10 |
| >Multiple E-UTRA frequency band indicator list | OP | 1 to <maxMultipleFrequcy BandsEUTRA> | | Indicates, per neighbour EARFCN, a list of frequency bands which the E-UTRA cells belong to. Absence of this IE indicates that there are no Multiple Bands for the particular EARFCN. | REL-10 |
| >>E-UTRA Frequency band | MP | | Integer (1..64) | | REL-10 |
| NOTE 1: If the value of "E-UTRA detection" is not identical across the frequency layers, UE behaviour is unspecified. | | | | | |

FIG. 9
System Information Block Type 19

```
InformationElements DEFINITIONS AUTOMATIC TAGS ::=

BEGIN
<<< skip unchanged text >>>

EUTRA-FrequencyAndPriorityInfo ::=   SEQUENCE {
    earfcn                           EARFCN,
    measurementBandwidth             EUTRA-MeasurementBandwidth          OPTIONAL,
    priority                         INTEGER (0..maxPrio-1),
    -- Actual value = IE value * 2
    qRxLevMinEUTRA                   INTEGER (-70..-22),
    -- Actual value = IE value * 2
    threshXhigh                      INTEGER (0..31),
    -- Actual value = IE value * 2
    threshXlow                       INTEGER (0..31),
    eutra-blackListedCellList        EUTRA-BlacklistedCellPerFreqList    OPTIONAL,
    eutraDetection                   BOOLEAN
}

EUTRA-FrequencyAndPriorityInfo-v920ext ::=   SEQUENCE {
    qqualMinEUTRA                    INTEGER (-34..-3)                   OPTIONAL,
    threshXhigh2                     INTEGER (0..31)                     OPTIONAL,
    threshXlow2                      INTEGER (0..31)                     OPTIONAL
}

EUTRA-FrequencyAndPriorityInfo-v11xyext ::=   SEQUENCE {
    widebandRSRQMeasurement          ENUMERATED (true)                   OPTIONAL,
    qqualMinEUTRA-WB-RSRQ            INTEGER (-xx..yy)                   OPTIONAL,
    threshXhigh2-WB-RSRQ             INTEGER (-xx..yy)                   OPTIONAL,
    threshXlow2-WB-RSRQ              INTEGER (-xx..yy)                   OPTIONAL
}

EUTRA-FrequencyAndPriorityInfoList ::=    SEQUENCE (SIZE (1..maxNumEUTRAFreqs)) OF
                                          EUTRA-FrequencyAndPriorityInfo EUTRA-FrequencyAndPriorityInfoList-v920ext ::=   SEQUENCE (SIZE (1..maxNumEUTRAFreqs)) OF
                                                 EUTRA-FrequencyAndPriorityInfo-v920ext EUTRA-FrequencyAndPriorityInfoList-v11xyext ::=  SEQUENCE (SIZE (1..maxNumEUTRAFreqs)) OF
                                                 EUTRA-FrequencyAndPriorityInfo-v11xyext EUTRA-FrequencyList ::=              SEQUENCE {
    eutraFrequencyRemoval                EUTRA-FrequencyRemoval,
    eutraNewFrequencies                  EUTRA-FrequencyInfoList         OPTIONAL
}

...

<<< Not affected ASN.1 >>>
```

FIG. 10

E-UTRA frequency and priority info list

| Information Element/Group name | Need | Multi | Type and reference | Semantics description | Version |
|---|---|---|---|---|---|
| >Wideband RSRQ measurements | OP | | Enumerated (TRUE) | This IE indicates whether the UE is required to perform RSRQ measurements with wider bandwidth. | REL-11 |
| >QqualminOffsetEUTRA for wideband RSRQ measurements | OP | | Integer (-xx..yy) | RSRQ offset, dB | REL-11 |
| >Thresh$_{x,\,high2}$ offset for wideband RSRQ measurements | OP | | Integer (-xx..yy) | RSRQ offset, dB | REL-11 |
| >Thresh$_{x,\,low2}$ offset for wideband RSRQ measurements | OP | | Integer (-xx..yy) | RSRQ offset, dB | REL-11 |
| Multiple E-UTRA frequency info list | OP | 1 to <maxNumEUTRAFreqs> | | Each entry in the list corresponds to an entry in the "E-UTRA frequency and priority" IE. | REL-10 |
| >Multiple E-UTRA frequency band indicator list | OP | 1 to <maxMultipleFrequcyBandsEUTRA> | | Indicates, per neighbour EARFCN, a list of frequency bands which the E-UTRA cells belong to. Absence of this IE indicates that there are no Multiple Bands for the particular EARFCN. | REL-10 |
| >>E-UTRA Frequency band | MP | | Integer (1..64) | | REL-10 |
| NOTE 1: If the value of "E-UTRA detection" is not identical across the frequency layers, UE behaviour is unspecified. | | | | | |

FIG. 12

*RRCConnectionRelease message*

```
-- ASN1START

RRCConnectionRelease ::=         SEQUENCE {
    rrc-TransactionIdentifier       RRC-TransactionIdentifier,
    criticalExtensions              CHOICE {
        c1                              CHOICE {
            rrcConnectionRelease-r8         RRCConnectionRelease-r8-IEs,
            spare3 NULL, spare2 NULL, spare1 NULL
        },
        criticalExtensionsFuture        SEQUENCE {}
    }
}

RRCConnectionRelease-r8-IEs ::=  SEQUENCE {
    releaseCause                    ReleaseCause,
    redirectedCarrierInfo           RedirectedCarrierInfo           OPTIONAL,     -- Need ON
    idleModeMobilityControlInfo     IdleModeMobilityControlInfo     OPTIONAL,     -- Need OP
    nonCriticalExtension            RRCConnectionRelease-v890-IEs   OPTIONAL
}

RRCConnectionRelease-v890-IEs ::= SEQUENCE {
    lateNonCriticalExtension        OCTET STRING                    OPTIONAL,     -- Need OP
    nonCriticalExtension            RRCConnectionRelease-v920-IEs   OPTIONAL
}

RRCConnectionRelease-v920-IEs ::= SEQUENCE {
    cellInfoList-r9                 CHOICE {
        geran-r9                        CellInfoListGERAN-r9,
        utra-FDD-r9                     CellInfoListUTRA-FDD-r9,
        utra-TDD-r9                     CellInfoListUTRA-TDD-r9,
        ...,
        utra-TDD-r10                    CellInfoListUTRA-TDD-r10
    }                                                               OPTIONAL,     -- Cond Redirection
    nonCriticalExtension            RRCConnectionRelease-v1020-IEs  OPTIONAL
}

RRCConnectionRelease-v1020-IEs ::= SEQUENCE {
    extendedWaitTime-r10            INTEGER (1..1800)               OPTIONAL,     -- Need ON
    nonCriticalExtension            SEQUENCE {}                     OPTIONAL      -- Need OP
}

ReleaseCause ::=                 ENUMERATED {loadBalancingTAUrequired,
                                             other, cs-FallbackHighPriority-v1020, spare1}

<Skip>
    ...,
    [[  widebandRSRQMeas-Offset     OffsetRange-r11                 OPTIONAL      -- Cond WB-RSRQ
    ]]
}

<Skip>
}

-- ASN1STOP
```

| RRCConnectionRelease field descriptions |
|---|
| ... |
| widebandRSRQ-Offset |
| The offset applied for UE supporting wideband RSRQ measurements when Squal based cell reselection is performed. This offset is applied for s-IntraSearch, s-NonIntraSearch, q-QualMin and threshServingLowQ in SIB3 and q-QualMin and threshX-Q in SIB5. |

FIG. 13

RRCConnectionRelease message

```
-- ASN1START

RRCConnectionRelease ::=           SEQUENCE {
...

RRCConnectionRelease-v1020-IEs ::= SEQUENCE {
    extendedWaitTime-r10           INTEGER (1..1800)       OPTIONAL,  -- Need ON
    nonCriticalExtension           SEQUENCE {}             OPTIONAL   -- Need OP
}

ReleaseCause ::=                   ENUMERATED {loadBalancingTAUrequired,
                                               other, cs-FallbackHighPriority-v1020, spare1}

RedirectedCarrierInfo ::=          CHOICE {
...
}

CarrierFreqListUTRA-TDD-r10 ::=    SEQUENCE (SIZE (1..maxFreqUTRA-TDD-r10)) OF
ARFCN-ValueUTRA ...,
    [[freqPriorityListEUTRA-v11xy          FreqPriorityListEUTRA-v11xy
    OPTIONAL,             -- Need ON
    ]]
}

FreqPriorityListEUTRA ::=          SEQUENCE (SIZE (1..maxFreq)) OF FreqPriorityEUTRA FreqPriorityEUTRA ::=              SEQUENCE {
    carrierFreq                    ARFCN-ValueEUTRA,
    cellReselectionPriority        CellReselectionPriority
}

FreqPriorityListEUTRA-v11xy ::=    SEQUENCE (SIZE (1..maxFreq)) OF
FreqPriorityEUTRA-v11xy FreqPriorityEUTRA-v11xy ::=        SEQUENCE {
    carrierFreq-r11                ARFCN-ValueEUTRA,
    cellReselectionPriority-r11    CellReselectionPriority,
    widebandRSRQMeas-Offset        OffsetRange-r11,
}
...
-- ASN1STOP
```

| RRCConnectionRelease field descriptions |
|---|
| widebandRSRQ-Offset |
| The offset applied for UE supporting wideband RSRQ measurements when Squal based cell reselection is performed. This offset is applied for s-IntraSearch, s-NonIntraSearch, q-QualMin and threshServingLowQ in SIB3 if the serving carrier frequency is correspondent to the indicated carrier frequency in this message and q-QualMin and threshX-Q in SIB5 if the carrier frequency in SIB5 is correspondent to the indicated carrier frequency in this message. |

FIG. 14

RRC CONNECTION REJECT

| Information Element/Group name | Need | Multi | Type and reference | Semantics description | Version |
|---|---|---|---|---|---|
| Message Type | MP | | Message Type | | |
| UE information elements | | | | | |
| RRC transaction identifier | MP | | RRC transaction identifier 10.3.3.36 | | |
| Initial UE identity | MP | | Initial UE identity 10.3.3.15 | | |
| Rejection cause | MP | | Rejection cause 10.3.3.31 | | |
| Wait time | MP | | Wait time 10.3.3.50 | | |
| Redirection info | OP | | Redirection info 10.3.3.29 | The UE shall ignore any unsupported frequencies included in this IE. | |

FIG. 15

RRC CONNECTION RELEASE

| Information Element/Group name | Need | Multi | Type and reference | Semantics description | Version |
|---|---|---|---|---|---|
| Message Type | MP | | Message Type | | |
| UE information elements | | | | | |
| ... | CV-CCCH | | | | REL-5 |
| Other information elements | | | | | |
| Rplmn information | OP | | Rplmn information 10.3.8.15 | | |
| Redirection info | OP | | Redirection info 10.3.3.29 | | REL-6 |

FIG. 16

Redirection info

| Information Element/Group name | Need | Multi | Type and reference | Semantics description | Version |
|---|---|---|---|---|---|
| CHOICE Redirection | MP | | | | |
| y info | | | Frequency info 10.3.6.36 | | |
| info | | | Inter-RAT info 10.3.7.25 | | |

FIG. 17

Inter-RAT info

| Information Element/Group name | Need | Multi | Type and reference | Semantics description | Version |
|---|---|---|---|---|---|
| Inter-RAT info | MP | | Enumerated (GSM | | |
| | | | , E-UTRA) | | REL-8 |
| GSM target cell info | CV-*GSM* | | GSM target cell info 10.3.8.4g | | REL-6 |
| E-UTRA target info | CV-*E-UTRA* | | E-UTRA target info 10.3.8.4L | | REL-8 |

FIG. 18

E-UTRA Target Info

| Information Element/Group name | Need | Multi | Type and reference | Semantics description | Version |
|---|---|---|---|---|---|
| E-UTRA Target Frequency Info List | MP | 1 to <maxEUTRATargetFreqs> | | | REL-8 |
| >DL Carrier frequency | MP | | Integer (0..65535) | EARFCN of the downlink carrier frequency [63] | REL-8 |
| >Blacklisted cells per freq list | OP | 1 to <maxEUTRACellPerFreq> | | | REL-8 |
| >>Physical Cell identity | MP | | Integer (0..503) | | REL-8 |
| >QqualminOffsetEUTRA for wideband RSRQ measurements | OP | | Integer (-xx..yy) | RSRQ offset, dB | REL-11 |
| >Thresh$_{x,\,high2}$ offset for wideband RSRQ measurements | OP | | Integer (-xx..yy) | RSRQ offset, dB | REL-11 |
| >Thresh$_{x,\,low2}$ offset for wideband RSRQ measurements | OP | | Integer (-xx..yy) | RSRQ offset, dB | REL-11 |

FIG. 19

UTRAN MOBILITY INFORMATION

| Information Element/Group name | Need | Multi | Type and reference | Semantics description | Version |
|---|---|---|---|---|---|
| Message Type | MP | | Message Type | | |
| UE Information Elements | | | | | |
| ... | | | | | |
| E-UTRAN Information Elements | | | | | |
| Wideband RSRQ measurement information list | OP | 1 to <maxE-UTRAFreqs> | | | REL-11 |
| >EARFCN | MP | | | | |
| >QqualminOffsetEUTRA for wideband RSRQ measurements | OP | | Integer (-xx..yy) | RSRQ offset, dB | REL-11 |
| >Thresh$_{x, high2}$ offset for wideband RSRQ measurements | OP | | Integer (-xx..yy) | RSRQ offset, dB | REL-11 |
| >Thresh$_{x, low2}$ offset for wideband RSRQ measurements | OP | | Integer (-xx..yy) | RSRQ offset, dB | REL-11 |

FIG. 20

System Information Block type 19

| Information Element/Group name | Need | Multi | Type and reference | Semantics description | Version |
|---|---|---|---|---|---|
| UTRA priority info list | MP | | UTRA priority info list 10.3.7.113 | | REL-8 |
| GSM priority info list | OP | | GSM priority info list 10.3.7.114 | | REL-8 |
| E-UTRA frequency and priority info list | OP | | E-UTRA frequency and priority info list 10.3.7.115 | | REL-8 |
| CELL_FACH Absolute Priority Measurement Indicator | OP | | Enumerated (High Priority Layers, All Layers) | High Priority Layers means that absolute priority measurements are only required in CELL_FACH state on higher priority layers when Srxlev and Squal of the serving cell are above Spriositysearch1 and Spriositysearch2. All Layers means that absolute priority measurements are always required in CELL_FACH state according to the rules in [4] and requirements in [19]. | REL-11 |

FIG. 21

E-UTRA frequency and priority info list

| Information Element/Group name | Need | Multi | Type and reference | Semantics description | Version |
|---|---|---|---|---|---|
| E-UTRA frequency and priority | | 1 to <maxNumEUTRAFreqs> | | | REL-8 |
| >EARFCN | MP | | Integer(0..65535) | EARFCN of the downlink carrier frequency [36.101] | REL-8 |
| >Measurement Bandwidth | MD | | Enumerated(6, 15, 25, 50, 75, 100) | Measurement bandwidth information common for all neighbouring cells on the carrier frequency. It is defined by the parameter Transmission Bandwidth Configuration, $N_{RB}$ [36.104]. The values indicate the number of resource blocks over which the UE could measure. Default value is 6. | REL-8 |
| >priority | MP | | Integer (0..<maxPrio−1>) | 0 is the lowest priority and maxPrio-1 is the highest. | REL-8 |
| >QrxlevminEUTRA | MP | | Integer (-140..-44 by step of 2) | RSRP, [dBm] | REL-8 |
| >Thresh$_{x,\,high}$ | MP | | Integer (0..62 by step of 2) | RSRP, dB | REL-8 |
| >Thresh$_{x,\,low}$ | MP | | Integer (0..62 by step of 2) | RSRP, dB | REL-8 |
| >QqualminEUTRA | MD | | Integer (-34..-3) | RSRQ, dB default value is negative infinity | REL-9 |
| >Thresh$_{x,\,High2}$ | OP | | Integer (0..31) | RSRQ, dB | REL-9 |
| >Thresh$_{x,\,low2}$ | OP | | Integer (0..31) | RSRQ, dB | REL-9 |
| >Wideband RSRQ measurement ID for idle | OP | | Integer (0..X) | ID specifying a list of wideband parameters to apply. | REL-11 |

FIG. 22

Table 8.1.2.3.1.1-1: RSRP measurement period and measurement bandwidth (TS 36.133)

| Configuration | Physical Layer Measurement period: $T_{Measurement\_Period\_Inter\_FDD}$ [ms] | Measurement bandwidth [RB] |
|---|---|---|
| 0 | 480 x $N_{freq}$ | 6 |
| 1 (Note) | 240 x $N_{freq}$ | 50 |
| Note: This configuration is optional | | |

MOBILE COMMUNICATION METHOD, RADIO ACCESS NETWORK APPARATUS, AND MOBILE STATION FOR CELL (RE)SELECTION PROCESSING BASED ON A RESULT OF RSRQ

TECHNICAL FIELD

The present invention relates to a mobile communication method, a radio access network apparatus, and a mobile station.

BACKGROUND ART

In LTE (Long Term Evolution), as shown in FIG. 22, two bandwidths, namely six resource blocks (RB) and fifty resource blocks, are defined as a bandwidth for measuring RSRP (Reference Signal Received Power) and RSRQ (Reference Signal Received Quality). The RSRP/RSRQ measurement in fifty resource blocks is optional, and in practice, the RSRP/RSRQ measurement is performed using six resource blocks in many cases.

As shown in FIG. 23, the RSRQ is measured from "the number of measurement resource blocks"בthe ratio of RSRP to RSSI (total received power within the measurement bandwidth in an OFDM symbol section including RSs)."

This causes the following problem. When a mobile station UE measures the RSRQ by using the six resource blocks at the center of the bandwidth used in LTE, the measured RSRQ is higher than an actual value because the actual amount of interference cannot be taken into consideration as shown in FIG. 24.

To solve such a problem, it is considered to define, in LTE/Release-11, a method for performing RSRQ measurement in a bandwidth larger than six resource blocks (referred to as "Wideband RSRQ measurement" hereinbelow).

Specifically, in the method being considered, a radio access network uses individual signaling or broadcast information to command a mobile station UE in an "RRC-Connected state," a mobile station UE in an "RRC-Idle state," or a mobile station UE camping on a UTRAN (Universal Terrestrial Radio Access Network to perform the "Wideband RSRQ measurement."

PRIOR ART DOCUMENT

Non-Patent Document

Non-patent document 1: 3GPP TS36.300
Non-patent document 2: 3GPP contribution R2-124813
Non-patent document 3: 3GPP contribution R2-124814
Non-patent document 4: 3GPP TS36.331
Non-patent document 5: 3GPP TS36.133

SUMMARY OF THE INVENTION

The RSRQ measurement in six resource blocks and "Wideband RSRQ measurement" result in different values.

Thus, a threshold used to perform "event triggered measurement reporting" and a threshold used to perform "idle mode cell reselection" should be different between a case of performing the RSRQ measurement in six resource blocks and a case of performing "Wideband RSRQ measurement."

Since the threshold used to perform "event triggered measurement reporting" can be set individually for each mobile station UE, a radio base station eNB can set an appropriate threshold according to whether the mobile station UE supports "Wideband RSRQ measurement" or not.

However, current LTE defines "idle mode cell reselection" as being performed without consideration of this point, and has not come up with the idea of changing the threshold used to perform "event triggered measurement reporting" and the threshold used to perform "idle mode cell reselection" between a case of performing the RSRQ measurement in six resource blocks and a case of performing "Wideband RSRQ measurement."

The present invention has been made in view of the above problem, and has an objective of providing a mobile communication method, a radio access network apparatus, and a mobile station capable of achieving appropriate "idle mode cell reselection" by changing the threshold used to perform the "idle mode cell reselection" between a case of performing the RSRQ measurement in six resource blocks and a case of performing "Wideband RSRQ measurement."

A first aspect of the present invention is summarized as a mobile communication method including: a step A of causing a radio access network apparatus to broadcast not only existing parameters used to perform cell reselection processing based on a result of RSRQ measurement in six resource blocks, but also wideband parameters used to perform cell reselection processing based on a result of RSRQ measurement in a bandwidth larger than six resource blocks; a step B of causing a mobile station capable of the RSRQ measurement in the bandwidth larger than six resource blocks to use the wideband parameters to perform the cell reselection processing based on a result of the RSRQ measurement in the bandwidth larger than six resource blocks; and a step C of causing a mobile station incapable of the RSRQ measurement in the bandwidth larger than six resource blocks to use the existing parameters to perform the cell reselection processing based on a result of the RSRQ measurement in six resource blocks.

A second aspect of the present invention is summarized as a radio access network apparatus including a transmission unit configured to broadcast not only existing parameters used to perform cell reselection processing based on a result of RSRQ (Reference Signal Received Quality) measurement in six resource blocks, but also wideband parameters used to perform cell reselection processing based on a result of RSRQ measurement in a bandwidth larger than six resource blocks.

A third aspect of the present invention is summarized as a mobile station configured to be able to perform cell reselection processing based on a result of RSRQ measurement in a bandwidth larger than six resource blocks, the mobile station including: a reception unit configured to acquire, from broadcast information transmitted by a radio access network apparatus, not only existing parameters used to perform cell reselection processing based on a result of RSRQ measurement in six resource blocks, but also wideband parameters used to perform the cell reselection processing based on a result of the RSRQ measurement in the bandwidth larger than six resource blocks; and a cell reselection unit configured to, when the wideband parameters are acquired, use the wideband parameters to perform the cell reselection processing based on a result of the RSRQ measurement in the bandwidth larger than six resource blocks.

A fourth aspect of the present invention is summarized as including: a step A of causing a radio access network apparatus to use an individual signal to transmit, to a mobile station capable of RSRQ measurement in a bandwidth larger than six resource blocks, wideband parameters used to perform cell reselection processing based on a result of the RSRQ measurement in the bandwidth larger than six resource blocks, in addition to existing parameters used to perform the cell reselection processing based on a result of RSRQ measurement in six resource blocks; and a step B of causing the mobile station to use the wideband parameters to perform the cell reselection processing based on a result of the RSRQ measurement in the bandwidth larger than six resource blocks.

A fifth aspect of the present invention is summarized as a radio access network apparatus including a transmission unit configured to use an individual signal to transmit, to a mobile station capable of RSRQ measurement in a bandwidth larger than six resource blocks, wideband parameters used to perform cell reselection processing based on a result of the RSRQ measurement in the bandwidth larger than six resource blocks, in addition to existing parameters used to perform cell reselection processing based on a result of RSRQ measurement in six resource blocks.

A sixth aspect of the present invention is summarized as a mobile station configured to be able to perform cell reselection processing based on a result of RSRQ measurement in a bandwidth larger than six resource blocks, the mobile station including: a reception unit configured to acquire, from an individual signal transmitted from a radio access network apparatus, wideband parameters used to perform cell reselection processing based on a result of the RSRQ measurement in the bandwidth larger than six resource blocks, in addition to existing parameters used to perform cell reselection processing based on a result of RSRQ measurement in six resource blocks; and a cell reselection unit configured to use the wideband parameters to perform the cell reselection processing based on a result of the RSRQ measurement in the bandwidth larger than six resource blocks.

A seventh aspect of the present invention is summarized as a mobile station configured to be able to perform cell reselection processing based on a result of RSRQ measurement in a bandwidth larger than six resource blocks, the mobile station including a cell reselection unit configured to: manage wideband parameters as fixed values, the wideband parameters being used to perform cell reselection processing based on a result of the RSRQ measurement in the bandwidth larger than six resource blocks; and use the wideband parameters to perform the cell reselection processing based on a result of the RSRQ measurement in the bandwidth larger than six resource blocks.

An eighth aspect of the present invention is summarized as a mobile communication method including: a step A of causing a radio access network apparatus to use an individual signal to transmit, to a mobile station capable of RSRQ measurement in a bandwidth larger than six resource blocks, multiple sets of wideband parameters used to perform cell reselection processing based on a result of the RSRQ measurement in the bandwidth larger than six resource blocks, in addition to existing parameters used to perform cell reselection processing based on a result of RSRQ measurement in six resource blocks; a step B of causing the radio access network apparatus to broadcast identification information specifying a set of wideband parameters to be used from the multiple sets of wideband parameters; and a step C of causing the mobile station to use the wideband parameters specified by the identification information to perform the cell reselection processing based on a result of the RSRQ measurement in the bandwidth larger than six resource blocks.

A ninth aspect of the present invention is summarized as a radio access network apparatus including a transmission unit configured to: use an individual signal to transmit, to a mobile station capable of RSRQ measurement in a bandwidth larger than six resource blocks, multiple sets of wideband parameters used to perform cell reselection processing based on a result of the RSRQ measurement in the bandwidth larger than six resource blocks, in addition to existing parameters used to perform cell reselection processing based on a result of RSRQ measurement in six resource blocks; and broadcast identification information specifying a set of wideband parameters to be used from the multiple sets of wideband parameters.

A tenth aspect of the present invention is summarized as a mobile station configured to be able to perform cell reselection processing based on a result of RSRQ measurement in a bandwidth larger than six resource blocks, the mobile station including: a reception unit configured to acquire, from an individual signal transmitted from a radio access network apparatus, multiple sets of wideband parameters used to perform the cell reselection processing based on a result of the RSRQ measurement in the bandwidth larger than six resource blocks, in addition to existing parameters used to perform cell reselection processing based on a result of RSRQ measurement in six resource blocks, and also configured to receive identification information specifying a set of wideband parameters to be used from the multiple sets of wideband parameters broadcasting by the radio base station eNB or the radio network controller RNC; and a cell reselection unit configured to use the wideband parameters specified by the identification information to perform the cell reselection processing based on a result of the RSRQ measurement in the bandwidth larger than six resource blocks.

BRIEF DESCRIPTION OF THE DRAWINGS

FIG. 3 is a diagram showing an example of a format of SIB5 broadcasted by the radio base station according to the first embodiment of the present invention.

FIG. 4 is a diagram showing an example of a format of SIB5 broadcasted by the radio base station according to the first embodiment of the present invention.

FIG. 6 is a diagram showing an example of a format of SIB19 broadcasted by the radio network controller according to the first embodiment of the present invention.

FIG. 7 is a diagram showing an example of a format of SIB19 broadcasted by the radio network controller according to the first embodiment of the present invention.

FIG. 8 is a diagram showing an example of a format of SIB19 broadcasted by the radio network controller according to the first embodiment of the present invention.

FIG. 9 is a diagram showing an example of a format of SIB19 broadcasted by the radio network controller according to the first embodiment of the present invention.

FIG. 10 is a diagram showing an example of a format of SIB19 broadcasted by the radio network controller according to the first embodiment of the present invention.

FIG. 12 is a diagram showing an example of a format of "RRCConnectionRelease" transmitted by a radio base station according to Modification 1 of the present invention.

FIG. 13 is a diagram showing an example of a format of "RRCConnectionRelease" transmitted by a radio base station according to Modification 3 of the present invention.

FIG. 14 is a diagram showing an example of a format of "RRC CONNECTION REJECT" transmitted by a radio network controller according to Modification 3 of the present invention.

FIG. 15 is a diagram showing an example of a format of "RRC CONNECTION RELEASE" transmitted by the radio network controller according to Modification 3 of the present invention.

FIG. 16 is a diagram showing an example of a format of an information element "Redirection info" in "RRC CONNECTION REJECT" and "RRC CONNECTION RELEASE" transmitted by the radio network controller according to Modification 3 of the present invention.

FIG. 17 is a diagram showing an example of a format of an information element "Inter-RAT info" in the information element "Redirection info" in "RRC CONNECTION REJECT" and "RRC CONNECTION RELEASE" transmitted by the radio network controller according to Modification 3 of the present invention.

FIG. 18 is a diagram showing an example of a format of an information element "E-UTRA Target Info" in the information element "Inter-RAT info" in the information element "Redirection info" in "RRC CONNECTION REJECT" and "RRC CONNECTION RELEASE" transmitted by the radio network controller according to Modification 3 of the present invention.

FIG. 19 is a diagram showing an example of a format of "UTRAN MOBILITY INFORMATION" transmitted by a radio network controller according to Modification 4 of the present invention.

FIG. 20 is a diagram showing an example of a format of SIB19 transmitted by a radio network controller according to Modification 5 of the present invention.

FIG. 21 is a diagram showing an example of a format of an information element "E-UTRA frequency and priority info list" in SIB19 transmitted by the radio network controller according to Modification 5 of the present invention.

FIG. 22 is a diagram illustrating a prior art.

MODE FOR CARRYING OUT THE INVENTION (Mobile Communication System According to the First Embodiment of the Present Invention)

With reference to FIGS. 1 to 11, a mobile communication system according to a first embodiment of the present invention is described.

Figure 1:
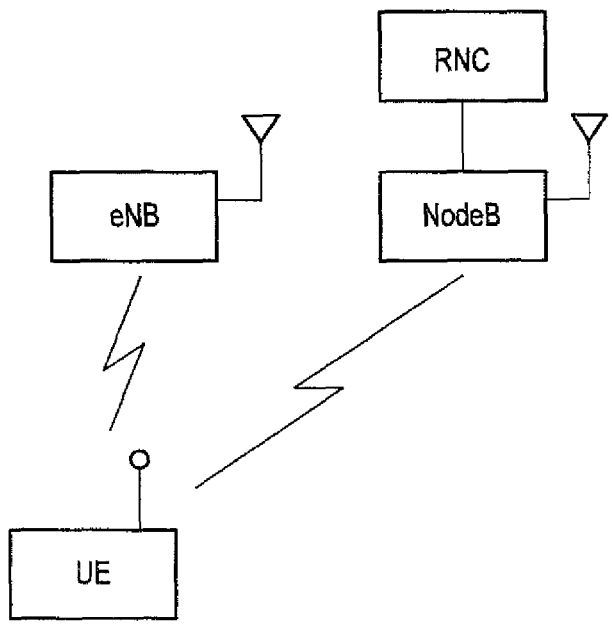
FIG. 1 is an overall configuration diagram of a mobile communication system according to a first embodiment of the preset invention.

As shown in FIG. 1, the mobile communication system according to this embodiment includes a radio base station eNB being a radio access network apparatus for LTE and a radio base station NodeB and a radio network controller RNC being a radio access network apparatus for UTRAN.

Figure 2:
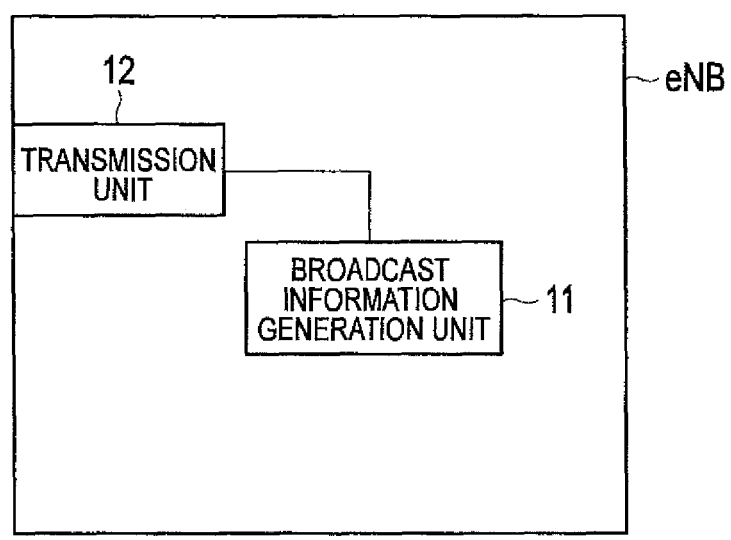
FIG. 2 is a functional block diagram of a radio base station according to the first embodiment of the present invention.

As shown in FIG. 2, the radio base station eNB according to this embodiment includes a broadcast information generation unit 11 and a transmission unit 12.

The broadcast information generation unit 11 is configured to generate broadcast information (e.g., SIB3 and SIB5) containing not only existing parameters used to perform "idle mode cell reselection" based on a result of RSRQ measurement in six resource blocks, but also wideband parameters used to perform the "idle mode cell reselection" based on a measurement result of "Wideband RSRQ measurement."

Among the wideband parameters, parameters contained in SIB3 used to perform the "idle mode cell reselection" from an LTE cell to another LTE cell (an intra-frequency cell and an inter-frequency cell) are, for example, "$S_{IntraSearchP}$," "$S_{IntraSearchQ}$," "$S_{nonIntraSearchP}$," "$S_{nonIntraSearchQ}$," "$Q_{qualmin}$" and "$Thresh_{Serving,LowQ}$."

"$S_{IntraSearchP}$" is a threshold of RSRP used to perform intra-frequency measurement ("s-IntraSearchP-r11" in FIG. 3).

"$S_{IntraSearchQ}$" is a threshold of RSRQ used to perform intra-frequency measurement ("s-IntraSearchQ-r11" in FIG. 3).

"$S_{nonIntraSearchP}$" is a threshold of RSRP used to perform inter-frequency measurement ("s-NonIntraSearchP-r11" in FIG. 3).

"$S_{nonIntraSearchQ}$" is a threshold of RSRQ used to perform inter-frequency measurement ("s-NonIntraSearchQ-r11" in FIG. 3).

"$Q_{qualmin}$" is used to perform "cell selection (cell selection processing)" and indicates a minimum-quality value of RSRQ of its own cell selectable for idle mode ("q-QualMin-FormWG-RSRQ-r11" in FIG. 3).

"$Thresh_{serving,LowQ}$" is a threshold of RSRQ of a serving cell, for performing "cell selection" to select an inter-frequency/inter-RAT cell of a low priority (threshServingLowQ-ForWB-RSRQ-r11" in FIG. 3).

Note that "s-IntraSearchP-r9," "s-IntraSearchQ-r9," "s-NonIntraSearchP-r9," "s-NonIntraSearchQ-r9," "q-QualMin-r9," "threshServingLowQ-r9" in FIG. 3 are the existing parameters described above.

"widebandRSRQMeas" in FIG. 3 is an information element commanding "Wideband RSRQ measurement."

Further, among the wideband parameters, parameters contained in SIB5 used to perform "idle mode cell reselection" from an LTE cell to another LTE cell (an intra-frequency cell and an inter-frequency cell) are, for example, "$Q_{qualmin}$" and "$Thresh_{X,HighQ}$," "$Thresh_{X,LowQ}$."

"$Q_{qualmin}$" is used to perform "cell selection" and indicates a minimum quality value of RSRQ of a neighbor cell selectable for idle mode ("q-QualMin-ForWG-RSRQ-r11" in FIG. 4).

"$Thresh_{X,HighQ}$" is a threshold of RSRQ of a neighbor cell, for performing "cell selection" to an inter-frequency cell of a high priority ("threshX-HighQ-r11" in FIG. 4).

"$Thresh_{X,LowQ}$" is a threshold of RSRQ of a neighbor cell, for performing "cell selection" to an inter-frequency cell of a low priority ("threshX-LowQ-r11" in FIG. 4).

Note that "q-QualMin-r9," "threshX-HighQ-r9," and "threshX-LowQ-r9" in FIG. 4 are the existing parameters described above.

The broadcast information generation unit 11 may be configured to set the actual values of the wideband parameters as the wideband parameters, or may be configured to set offset values to the above-described existing parameters as the wideband parameters.

The transmission unit 12 is configured to transmit the broadcast information (e.g., SIB3, SIB5, and the like) generated by the broadcast information generation unit 11.

Figure 5:
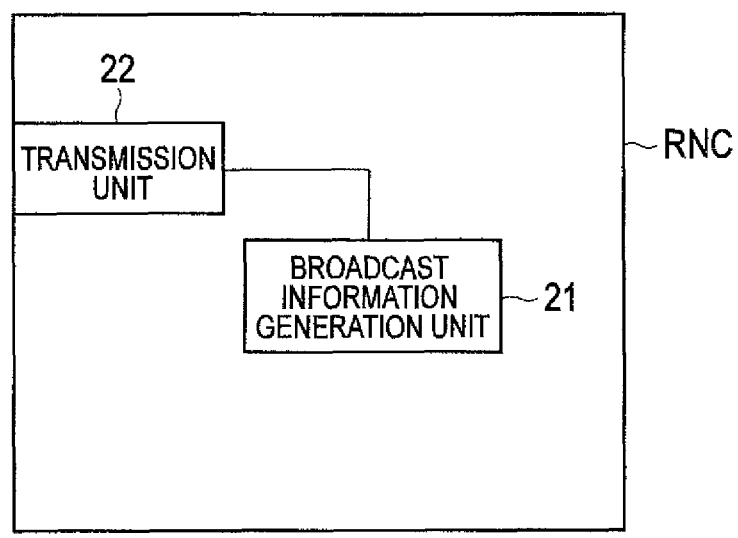
FIG. 5 is a functional block diagram of a radio network controller according to the first embodiment of the present invention.

As shown in FIG. 5, the radio network controller RNC according to this embodiment includes a broadcast information generation unit 21 and a transmission unit 22.

The broadcast information generation unit 21 is configured to generate broadcast information (e.g., SIB19) containing not only existing parameters used to perform "idle mode cell reselection" based on a result of RSRQ measurement in six resource blocks, but also wideband parameters used to perform "idle mode cell reselection" based on a measurement result of "Wideband RSRQ measurement."

Among the wideband parameters, parameters used to perform "idle mode cell reselection" from a UTRAN cell to an LTE cell are, for example, "$Q_{qualmin}$," "$Thresh_{X,High2}$," and "$Thresh_{X,Low2}$."

"$Q_{qualmin}$" is used to perform "cell selection" and indicates a minimum quality value of RSRQ of a neighbor cell selectable for idle mode ("qqualMinEUTRA-WB-RSRQ" in FIG. 6 and "QqualminEUTRA for wideband RSRQ measurements" in "E-UTRA frequency and priority info list" in FIGS. 7 and 8).

"$Thresh_{X,High2}$" is a threshold of RSRQ of a neighbor cell, for performing "cell selection" to an inter-frequency cell of a high priority ("threshXhigh2-WB-RSRQ" in FIG. 6 and "$Thresh_{X,High2}$ for wideband RSRQ measurements" in "E-UTRA frequency and priority info list" in FIGS. 7 and 8).

"$Thresh_{X,Low2}$" is a threshold of RSRQ of a neighbor cell, for performing "cell selection" to an inter-frequency cell of a low priority ("threshXlow2-WB-RSRQ" in FIG. 6 and "$Thresh_{X,Low2}$ for wideband RSRQ measurements" in "E-UTRA frequency and priority info list" in FIGS. 7 and 8).

Note that "qqualMinEUTRA," "threshXhigh2," and "threshXlow2" in FIG. 6 are the existing parameters described above.

"widebandRSRQMeasurement" in FIG. 6 and "Wideband RSRQ measurements" in "E-UTRA frequency and priority info list" in FIGS. 7 and 8 are information elements commanding "Wideband RSRQ measurement."

The broadcast information generation unit 21 may be configured to set the actual values of the wideband parameters as the above-described wideband parameters as shown in FIGS. 6 to 8, or set offset values to the above-described existing parameters as the above-described wideband parameters as shown in FIGS. 9 and 10.

Figure 11:
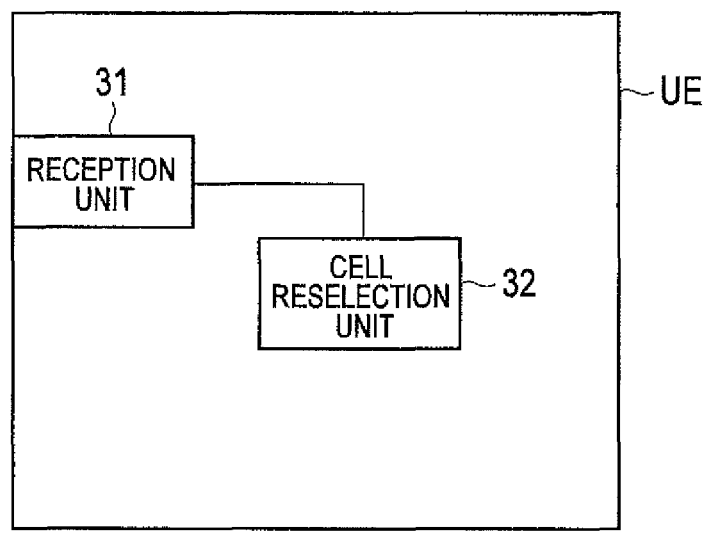
FIG. 11 is a functional block diagram of a mobile station according to the first embodiment of the present invention.
Figure 23:
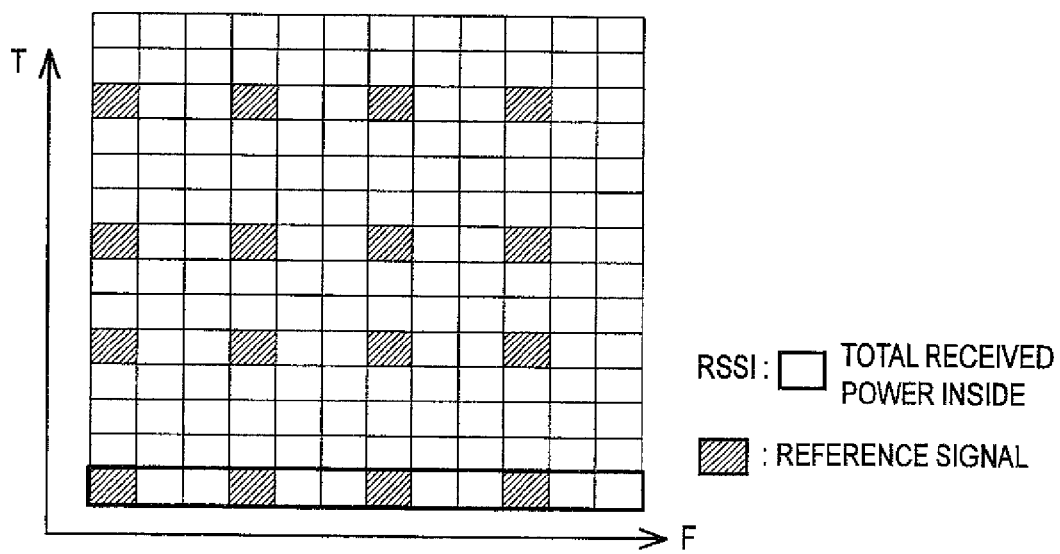
FIG. 23 is a diagram illustrating a prior art.
Figure 24:
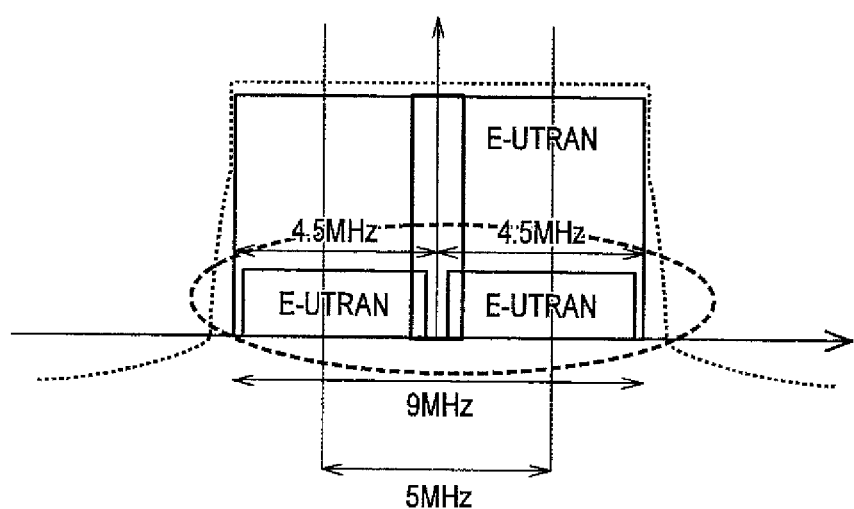
FIG. 24 is a diagram illustrating a prior art.

As shown in FIG. 11, a mobile station UE according to this embodiment includes a reception unit 31 and a cell reselection unit 32.

Note that the mobile station UE according to this embodiment is configured to be able to perform "idle mode cell reselection" based on a measurement result of "Wideband RSRQ measurement."

The reception unit 31 is configured to acquire not only the above-described existing parameters, but also the above-described wideband parameters from the broadcast information transmitted by the radio base station eNB (SIB3 and SIB5) or the broadcast information (SIB19) transmitted by the radio network controller RNC.

The cell reselection unit 32 is configured to perform "idle mode cell reselection" based on a measurement result of "Wideband RSRQ measurement" using the above-described wideband parameters when these wideband parameters are acquired.

(Modification 1)

With reference to FIG. 12, a mobile communication system according to Modification 1 of the present invention is described below, with a focus on differences from the mobile communication system according to the first embodiment described above.

The mobile communication system according to Modification 1 may be configured as follows. Specifically, when the mobile station UE capable of "Wideband RSRQ measurement" transitions from the "RRC-Connected state" to the "RRC-Idle state," the transmission unit 12 of the radio base station eNB and the transmission unit 22 of the radio network controller RNC use an individual signal, e.g., "RRCConnectionRelease," "RRCConnectionReject (connection rejection signal)," or the like to transmit, to the mobile station UE, the wideband parameters used to perform "idle mode cell reselection" based on a measurement result of "Wideband RSRQ measurement," in addition to the existing parameters used to perform "idle mode cell reselection" based on a result of RSRQ measurement in six resource blocks.

The wideband parameters transmitted by the transmission unit 12 of the radio base station eNB and the transmission unit 22 of the radio network controller RNC may be common to the mobile stations UE in the same cell.

Note that the transmission unit 12 of the radio base station eNB and the transmission unit 22 of the radio network controller RNC may be configured to transmit offset values to the above-described existing parameters as the above-described wideband parameters.

Specifically, as shown in FIG. 12, the transmission unit 12 of the radio base station eNB and the transmission unit 22 of the radio network controller RNC may be configured to transmit offset values to the above-described existing parameters as the wideband parameters, by using an information element "widebandRSRQMeas-Offset" in "RRCConnectionRelease."

The reception unit 31 of the mobile station UE capable of "Wideband RSRQ measurement" is configured to acquire the wideband parameters used to perform "idle mode cell reselection" based on a measurement result of "Wideband RSRQ measurement" from "RRCConnectionRelease" transmitted by the radio base station eNB or the radio network controller RNC, in addition to the existing parameters used to perform "idle mode cell reselection" based on a result of RSRQ measurement in six resource blocks.

The cell reselection unit 32 of the mobile station UE is configured to perform "idle mode cell reselection" based on a measurement result of "Wideband RSRQ measurement" by using the wideband parameters when the wideband parameters are acquired.

(Modification 2)

A mobile communication system according to Modification 2 of the present invention is described below, with a focus on differences from the mobile communication system according to the first embodiment described above.

In the mobile communication system according to Modification 2, the cell selection unit 32 of the mobile station UE capable of "Wideband RSRQ measurement" may be configured to manage the wideband parameters as fixed values, the wideband parameters being used to perform "idle mode cell reselection" based on a measurement result of "Wideband RSRQ measurement."

The cell reselection unit 32 of the above mobile station UE is configured to perform "idle mode cell reselection" based on a measurement result of "Wideband RSRQ measurement" by using those wideband parameters.

The cell reselection unit 32 of the above mobile station UE may be configured to update the wideband parameters managed as fixed values, when notified of wideband parameters by the radio base station eNB or the radio network controller RNC through a predetermined signal (e.g., "RRConnectionRelease").

(Modification 3)

With reference to FIGS. 13 to 18, a mobile communication system according to Modification 3 of the present invention is described below, with a focus on differences from the mobile communication systems according to the first embodiment and Modification 1 described above.

In the mobile communication system according to Modification 3, the transmission unit 12 of the radio base station eNB is configured to transmit offset values to the above-described existing parameters for each frequency (EARFCN: E-UTRAN Absolute Radio Frequency Channel Number).

For example, as shown in FIG. 13, the transmission unit 12 of the radio base station eNB may be configured to transmit, as the above-described wideband parameters, offset values to the above-described existing parameters ("widebandRSRQMeas-Offset" in FIG. 13) for each frequency (EARFCN) by using an information element "FreqPriorityLestEUTRA-v11xy" in "RRConnection Release".

Similarly, in the mobile communication system according to Modification 3, the transmission unit 22 of the radio network controller RNC is configured to transmit offset values to the above-described existing parameters for each frequency (EARFCN).

For example, as shown in FIGS. 14 to 18, the transmission unit 22 of the radio network controller RNC may be configured to transmit, as the wideband parameters described above, offset values to the above-described existing parameters ("QqualminOffsetEUTRA for wideband RSRQ measurements," "Thresh$_{X,high2}$offset for wideband RSRQ measurements," or "Thresh$_{X,low2}$offset for wideband RSRQ measurements" shown in FIG. 18) for each frequency (EARFCN) by using "E-UTRA Target Info" in an information element "Inter-RA info" in an information element "Redirection info" in "RRC CONNECTION REJECT" and "RRC CONNECTION RELEASE."

(Modification 4)

With reference to FIG. 19, a mobile communication system according to Modification 4 of the present invention is described below, with a focus on differences from the mobile communication systems according to the first embodiment and Modification 1 described above.

In the mobile communication system according to Modification 4 of the present invention, the transmission unit 22 of the radio network controller RNC is configured to use an individual signal "UTRAN MOBILITY INFORMATION" to transmit, to a mobile station UE capable of "Wideband RSRQ measurement," wideband parameters used to perform "idle mode cell reselection" based on a measurement result of "Wideband RSRQ measurement," in addition to existing parameters used to perform "idle mode cell reselection" based on a result of RSRQ measurement in six resource blocks.

The transmission unit 22 of the radio network controller RNC may be configured to transmit, as the wideband parameters described above, offset values to the above-described existing parameters by using "UTRAN MOBILITY INFORMATION."

Alternatively, the transmission unit 22 of the radio network controller RNC may be configured to transmit offset values to the above-described existing parameters for each frequency (EARFCN) by using "UTRAN MOBILITY INFORMATION."

For example, as shown in FIG. 19, the transmission unit 22 of the radio network controller RNC may be configured to transmit, as the wideband parameters described above, offset values to the above-described existing parameters ("QqualminOffsetEUTRA for wideband RSRQ measurements," "Thresh$_{X,high2}$offset for wideband RSRQ measurements," or "Thresh$_{X,low2}$offset for wideband RSRQ measurements" shown in FIG. 18) for each frequency (EARFCN) by using "UTRAN MOBILITY INFORMATION."

(Modification 5)

A mobile communication system according to Modification 5 of the present invention is described below, with a focus on differences from the mobile communication system according to the first embodiment described earlier.

In the mobile communication system according to Modification 5 of the present invention, the transmission unit 22 of the radio network controller RNC is configured to use an individual signal (e.g., "RRCConnectionRelease," "RRCConnectionReject," "UTRAN MOBILITY INFORMATION," or the like) to transmit, to a mobile station UE capable of "Wideband RSRQ measurement," multiple sets of wideband parameters (e.g., up to 4 patterns of sets of wideband parameters) used to perform "idle mode cell reselection" based on a measurement result of "Wideband RSRQ measurement," in addition to existing parameters used to perform "idle mode cell reselection" based on a result of RSRQ measurement in six resource blocks.

In addition, the transmission unit 22 of the radio network controller RNC is configured to broadcast, in its controlling cell, identification information specifying a set of wideband parameters to be used from the multiple sets of wideband parameters.

The transmission unit 22 of the radio network controller RNC may be configured to broadcast the identification information by using SIB19.

For example, as shown in FIGS. 20 and 21, the transmission unit 22 of the radio network controller RNC may be configured to broadcast the identification information by using an information element "E-UTRA frequency and priority info list" in SIB19.

Further, the transmission unit 22 of the radio network controller RNC may be configured to broadcast the identification information for each frequency (EARFCN).

In a case where the transmission unit 22 of the radio network controller RNC transmits up to four patterns of sets of wideband parameters, the identification information needs only two bits, which allows reduction in the amount of information to be broadcasted.

Further, the cell reselection unit 32 of the mobile station UE is configured to perform "idle mode cell reselection" based on a measurement result of "Wideband RSRQ measurement" by using the wideband parameters specified by the identification information described above.

The transmission unit 12 of the radio base station eNB may also be configured to transmit the multiple sets of wideband parameters and broadcast the identification information described above.

The features of the above-described embodiment may also be expressed as follows.

A first aspect of this embodiment is summarized as a mobile communication method including: a step A of causing a radio base station eNB or a radio network controller RNC (radio access network apparatus) to broadcast not only existing parameters used to perform "idle mode cell reselection (cell reselection processing)" based on a result of RSRQ measurement in six resource blocks, but also wideband parameters used to perform the "idle mode cell reselection" based on a measurement result of "Wideband RSRQ measurement" (result of RSRQ measurement with a bandwidth larger than six resource blocks); a step B of causing a mobile station UE capable of the "Wideband RSRQ measurement" to use the wideband parameters to perform the "idle mode cell reselection" based on a result of the "Wideband RSRQ measurement;" and a step C of causing a mobile station UE incapable of the "Wideband RSRQ measurement" to use the existing parameters to perform the "idle mode cell reselection" based on a result of the RSRQ measurement in six resource blocks.

According to such a above configuration, the radio base station eNB and the radio network controller RNC can set parameters (existing parameters or wideband parameters)

used to perform "idle mode cell reselection" according to whether the mobile station UE supports "Wideband RSRQ measurement" or not. Thus, appropriate "idle mode cell reselection" can be achieved by taking a difference between RSRQ measurement results into consideration.

In the first aspect of the present embodiment, in the step A, the radio base station eNB or the radio network controller RNC may broadcast offset values to the existing parameters as the wideband parameters described above.

According to such a configuration, the radio base station eNB or the radio network controller RNC can notify of the above-described wideband parameters with a small amount of data.

A second aspect of this embodiment is summarized as a radio base station eNB or a radio network controller RNC including a transmission unit 12/22 configured to broadcast not only existing parameters used to perform "idle mode cell reselection" based on a result of RSRQ (Reference Signal Received Quality) measurement in six resource blocks, but also wideband parameters used to perform the "idle mode cell reselection" based on a result of "Wideband RSRQ measurement."

A third aspect of this embodiment is summarized as a mobile station UE configured to be able to perform "idle mode cell reselection" based on a result of "Wideband RSRQ measurement", the mobile station UE including: a reception unit 31 configured to acquire, from broadcast information transmitted by a radio base station eNB or a radio network controller RNC, not only existing parameters used to perform the cell reselection processing based on a result of RSRQ measurement in six resource blocks, but also wideband parameters used to perform the "idle mode cell reselection" based on a result of the "Wideband RSRQ measurement;" and a cell reselection unit 32 configured to, when the wideband parameters are acquired, use the wideband parameters to perform the "idle mode cell reselection" based on a result of the "Wideband RSRQ measurement."

A fourth aspect of this embodiment is summarized as including: a step A of causing a radio base station eNB or a radio network controller RNC to use an individual signal to transmit, to a mobile station UE capable of "Wideband RSRQ measurement" with a bandwidth larger than six resource blocks, wideband parameters used to perform "idle mode cell reselection" based on a result of the "Wideband RSRQ measurement," in addition to existing parameters used to perform the "idle mode cell reselection" based on a result of RSRQ measurement; and a step B of causing the mobile station UE to use the wideband parameters to perform the "idle mode cell reselection" based on a result of the "Wideband RSRQ measurement."

In the fourth aspect of the present embodiment, in the step A, the radio base station eNB or the radio network controller RNC may transmit offset values to the above-described existing parameters as the wideband parameters described above.

In the fourth aspect of the present embodiment, in the step A, the radio base station eNB or the radio network controller RNC may transmit offset values to the above-described existing parameters for each frequency.

A fifth aspect of this embodiment is summarized as a radio base station eNB or a radio network controller RNC including a transmission unit 12/22 configured to use an individual signal to transmit, to a mobile station UE capable of "Wideband RSRQ measurement," wideband parameters used to perform "idle mode cell reselection" based on a result of the "Wideband RSRQ measurement," in addition to existing parameters used to perform "idle mode cell reselection" based on a result of "Wideband RSRQ measurement."

A sixth aspect of this embodiment is summarized as a mobile station UE configured to be able to perform "idle mode cell reselection" based on a result of "Wideband RSRQ measurement," the mobile station including: a reception unit 31 configured to acquire, from an individual signal transmitted from a radio base station eNB or a radio network controller RNC, wideband parameters used to perform "idle mode cell reselection" based on a result of the "Wideband RSRQ measurement," in addition to existing parameters used to perform "idle mode cell reselection" based on a result of RSRQ measurement in six resource blocks; and a cell reselection unit 32 configured to use the wideband parameters to perform the "idle mode cell reselection" based on a result of the "Wideband RSRQ measurement."

A seventh aspect of this embodiment is summarized as a mobile station UE configured to be able to perform "idle mode cell reselection" based on a result of "Wideband RSRQ measurement," the mobile station UE including a cell reselection unit 32 configured to: manage wideband parameters as fixed values, the wideband parameters being used to perform "idle mode cell reselection" based on a result of the Wideband RSRQ measurement;" and use the wideband parameters to perform the "idle mode cell reselection" based on a result of the "Wideband RSRQ measurement."

An eighth aspect of this embodiment is summarized as a mobile communication method including: a step A of causing a radio base station eNB or a radio network controller RNC to use an individual signal to transmit, to a mobile station UE capable of "Wideband RSRQ measurement," multiple sets of wideband parameters used to perform "idle mode cell reselection" based on a result of the "Wideband RSRQ measurement," in addition to existing parameters used to perform "idle mode cell reselection" based on a result of RSRQ measurement in six resource blocks; a step B of causing the radio base station eNB or the radio network controller RNC to broadcast identification information specifying a set of wideband parameters to be used from the multiple sets of wideband parameters; and a step C of causing the mobile station UE to use the wideband parameters specified by the identification information to perform the "idle mode cell reselection" based on a result of the "Wideband RSRQ measurement."

In the eighth aspect of the present embodiment, in the step A, the radio base station eNB or the radio network controller RNC may transmit multiple sets of offset values to the existing parameters, as the above-described multiple sets of wideband parameters.

In the eighth aspect of the present embodiment, in the step A, the radio base station eNB or the radio network controller RNC may transmit the above-described identification information for each frequency.

In the fourth and eighth aspects of the present embodiment, the above-described discrete signal may be "RRCConnectionRelease (connection release signal)," "RRCConnectionReject (connection reject signal)," or "UTRA MOBILITY INFORMATION."

A ninth aspect of this embodiment is summarized as a radio base station eNB or a radio network controller RNC including a transmission unit 12/22 configured to: use an individual signal to transmit, to a mobile station UE capable of "Wideband RSRQ measurement," multiple sets of wideband parameters used to perform "idle mode cell reselection" based on a result of the "Wideband RSRQ measurement," in addition to existing parameters used to perform "idle mode cell reselection" based on a result of RSRQ measurement in six resource blocks; and broadcast identification information specifying a set of wideband parameters to be used from the multiple sets of wideband parameters.

A tenth aspect of this embodiment is summarized as a mobile station UE configured to be able to perform "idle mode cell reselection" based on a result of "Wideband RSRQ measurement," the mobile station UE including: a reception unit 31 configured to acquire, from an individual signal transmitted from a radio base station eNB or a radio network controller RNC, multiple sets of wideband parameters used to perform the "idle mode cell reselection" based on a result of the "Wideband RSRQ measurement," in addition to existing parameters used to perform "idle mode cell reselection" based on a result of RSRQ measurement in six resource blocks, and also configured to receive identification information specifying a set of wideband parameters to be used from the multiple sets of wideband parameters broadcasting by the radio base station eNB or the radio network controller RNC; and a cell reselection unit 31 configured to use the wideband parameters specified by the identification information to perform the "idle mode cell reselection" based on a result of the "Wideband RSRQ measurement."

It should be noted that the foregoing operations of the mobile station UE, the radio base station eNB/Node B and the radio network controller RNC may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile station UE, the radio base station eNB/Node B and the radio network controller RNC. Otherwise, the storage medium and the processor may be provided as discrete components inside the mobile station UE, the radio base station eNB/Node B and the radio network controller RNC.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire contents of Japanese Patent Application No. 2012-223641 (filed on Oct. 5, 2012), Japanese Patent Application No. 2012-242809 (filed on Nov. 2, 2012), and Japanese Patent Application No. 2013-007466 (filed on Jan. 18, 2013) are incorporated by reference in the present specification.

INDUSTRIAL APPLICABILITY

As described above, the present invention is capable of providing a mobile communication method, a radio access network apparatus, and a mobile station capable of achieving appropriate "idle mode cell reselection" by changing the threshold used in performing the "idle mode cell reselection" between a case of performing the RSRQ measurement in six resource blocks and a case of performing "Wideband RSRQ measurement."

EXPLANATION OF THE REFERENCE NUMERALS

UE mobile station
RNC radio network controller
eNB, NodeB radio base station
11, 21 broadcast information generation unit
12, 22 transmission unit
31 reception unit
32 cell reselection unit

The invention claimed is:

1. A mobile communication method comprising:
a step A of causing a radio access network apparatus to broadcast not only existing parameters used to perform cell reselection processing based on a result of RSRQ (Reference Signal Received Quality) measurement in six resource blocks, but also wideband parameters used to perform cell reselection processing based on a result of RSRQ measurement in a bandwidth larger than six resource blocks;
a step B of causing a mobile station capable of the RSRQ measurement in the bandwidth larger than six resource blocks to use the wideband parameters to perform the cell reselection processing based on the result of the RSRQ measurement in the bandwidth larger than six resource blocks; and
a step C of causing a mobile station incapable of the RSRQ measurement in the bandwidth larger than six resource blocks to use the existing parameters to perform the cell reselection processing based on the result of the RSRQ measurement in six resource blocks.

2. A mobile communication method comprising:
a step A of causing a radio access network apparatus to broadcast not only existing parameters used to perform cell selection processing and indicating a minimum quality value of RSRQ (Reference Signal Received Quality) in six resource blocks in a cell selectable for idle mode under the radio access network apparatus, but also wideband parameters used to perform the cell selection processing and indicating a minimum quality value of the RSRQ in a bandwidth larger than six resource blocks in the cell selectable for idle mode;
a step B of causing a mobile station capable of RSRQ measurement in the bandwidth larger than six resource blocks to use the wideband parameters; and
a step C of causing a mobile station incapable of the RSRQ measurement in the bandwidth larger than six resource blocks to use the existing parameters.

3. A radio access network apparatus comprising
a transmission unit configured to broadcast not only existing parameters used to perform cell reselection processing based on a result of RSRQ (Reference Signal Received Quality) measurement in six resource blocks, but also wideband parameters used to perform cell reselection processing based on a result of RSRQ measurement in a bandwidth larger than six resource blocks.

4. A mobile station configured to be able to perform cell reselection processing based on a result of RSRQ (Reference Signal Received Quality) measurement in a bandwidth larger than six resource blocks, the mobile station comprising:
a reception unit configured to acquire, from broadcast information transmitted by a radio access network apparatus, not only existing parameters used to perform cell reselection processing based on a result of RSRQ measurement in six resource blocks, but also wideband parameters used to perform the cell reselection processing based on the result of the RSRQ measurement in the bandwidth larger than six resource blocks; and a cell reselection unit configured to, when the wideband parameters are acquired, use the wideband parameters to perform the cell reselection processing based on the result of the RSRQ measurement in the bandwidth larger than six resource blocks.

5. A radio access network apparatus comprising a transmission unit configured to broadcast not only existing parameters used to perform the cell selection processing and indicating a minimum quality value of RSRQ (Reference Signal Received Quality) in six resource blocks in a cell selectable for idle mode under the radio access network apparatus, but also wideband parameters used to perform the cell selection processing and indicating a minimum quality value of the RSRQ in a bandwidth larger than six resource blocks in the cell selectable for idle mode.

6. A mobile station, wherein the mobile station is configured to:

acquire, from broadcast information transmitted by a radio access network apparatus, not only existing parameters used to perform the cell selection processing and indicating a minimum quality value of RSRQ (Reference Signal Received Quality) in six resource blocks in a cell selectable for idle mode under the radio access network apparatus, but also wideband parameters used to perform the cell selection processing and indicating a minimum quality value of the RSRQ in a bandwidth larger than six resource blocks in the cell selectable for idle mode; and use the wideband parameters upon acquisition of the wideband parameters.

* * * * *